United States Patent [19]
Abel

[11] 3,728,545
[45] Apr. 17, 1973

[54] INFRARED IMAGING APPARATUS
[75] Inventor: Irving R. Abel, Lexington, Mass.
[73] Assignee: Honeywell Inc., Minneapolis, Minn.
[22] Filed: Apr. 28, 1971
[21] Appl. No.: 138,085

[52] U.S. Cl. ......................................... 250/83.3 HP
[51] Int. Cl. ................................................. G01t 1/24
[58] Field of Search ................... 250/83.3 H, 83.3 HP

[56] References Cited

UNITED STATES PATENTS

| 3,604,932 | 9/1971 | Beach | 250/83.3 H |
| 3,508,051 | 4/1970 | Nichols et al. | 250/83.3 H X |
| 3,153,723 | 10/1964 | Weiss | 250/83.3 H |
| 3,353,022 | 11/1967 | Schwartz | 250/83.3 HP |

Primary Examiner—James W. Lawrence
Assistant Examiner—Davis L. Willis
Attorney—Charles J. Ungemach, Albin Medved and George W. Field

[57] ABSTRACT

An infrared scanning system comprising input optics including objective and field lenses, output optics including a relay lens and a linear array of detectors, a scanner including a hollow inwardly reflecting polygonal prism rotated about its longitudinal axis, which is aligned with the axis of the input optics, and further optical components including a relay lens, a strip mirror, and first and second folding mirrors, which are contained within the outline of the prism, and with respect to which the prism rotates.

16 Claims, 4 Drawing Figures

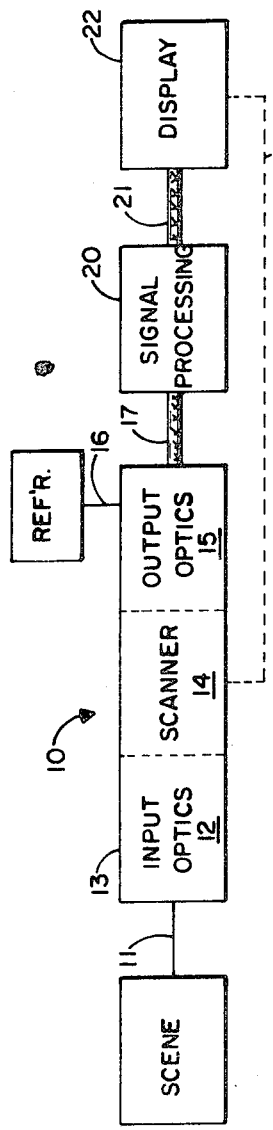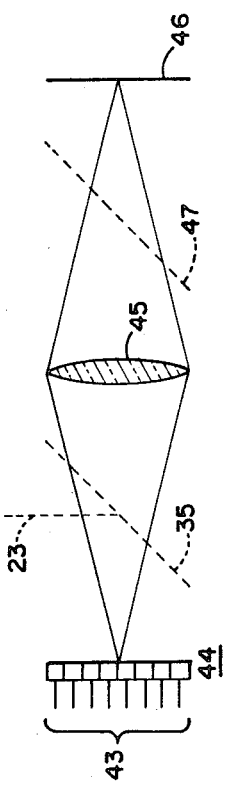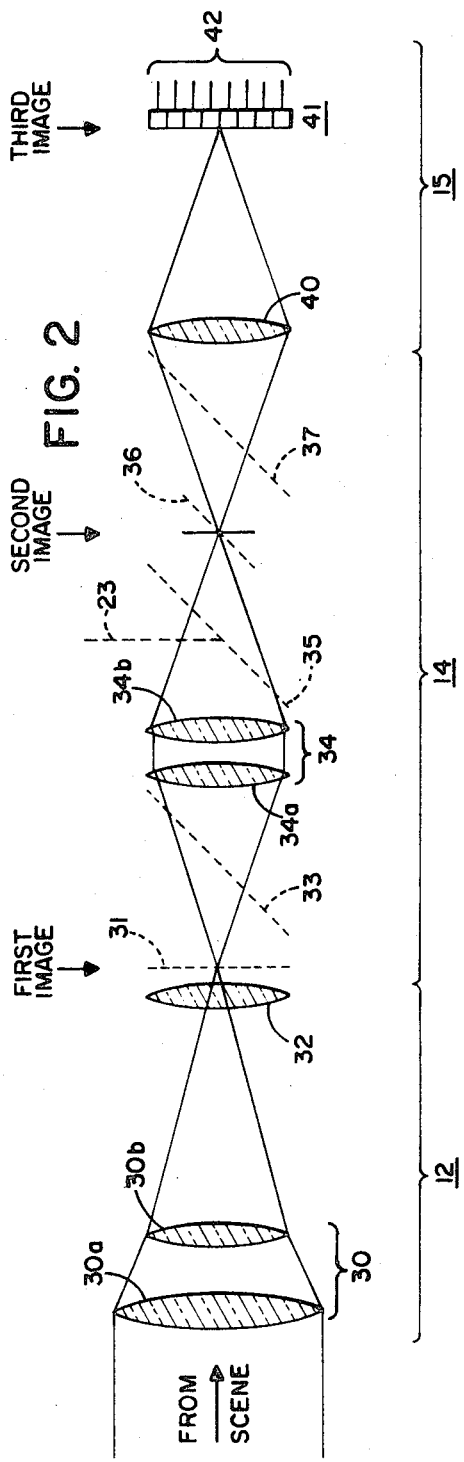

INVENTOR.
IRVING R. ABEL
ATTORNEY 3,728,545

INFRARED IMAGING APPARATUS

BACKGROUND OF THE INVENTION

This invention relates to the field of optical instruments, and more particularly to infrared sensitive imaging apparatus for use in a moving aircraft to perform continuous repeated transverse scans of the terrain below.

The use of infrared wavelengths in aerial reconnaissance is of known advantage, but requires some means for making the radiation perceptible to an observer. Detectors for converting infrared energy to electrical energy are known, and in theory if the radiation from a scene were projected on a mosaic of such detectors a set of electrical signals reproducible as a continuous picture of the scene would result. In practice the art has not yet developed to the point where faultless detector mosaics are reliably producible. Reproduction of the electrical signals also presents difficulties: if the mosaic is to be multiplexed, detector usage is extremely inefficient unless electronic signal storage is provided, with concommitent circuit complexity, while if parallel read-out and display of the mosaic is contemplated, the complexity involved therein is comparable to that of a multiplex system.

The alternatives to a detector mosaic system are systems in which the field of view time-shares a single detector or a simple linear array of detectors, by the use of an opto-mechanical scanning arrangement. Time-sharing of a single detector by use of some form of area scanner is most efficient as far as detector utilization is concerned, but does not provide the sensitivity and resolution of a multiple detector system with a simple transverse scan. The latter system thus appears to offer the optimum compromise between complexity and sensitivity.

The present invention has for its object to provide an improved infrared imaging system using a linear array of detectors across which the field of view of the instrument is cyclically swept by a novel optical scanner which gives a linear scan at a rapid rate with good resolution, good stability, and good transmittence of the radiant energy, and which is compact, easily constructed, and readily aligned.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing, which forms a further part hereof, and to the accompanying descriptive matter, in which there is illustrated and described a preferred embodiment of the invention.

BRIEF DESCRIPTION OF THE DRAWINGS

In the drawings,

FIG. 1 is a block diagram of an infrared imaging system including my invention;

FIG. 2 is a schematic diagram of the optics of my scanner;

FIG. 3 schematically discloses one display arrangement suitable for use with my scanner.

DESCRIPTION OF THE PREFERRED EMBODIMENT

Figure 4:
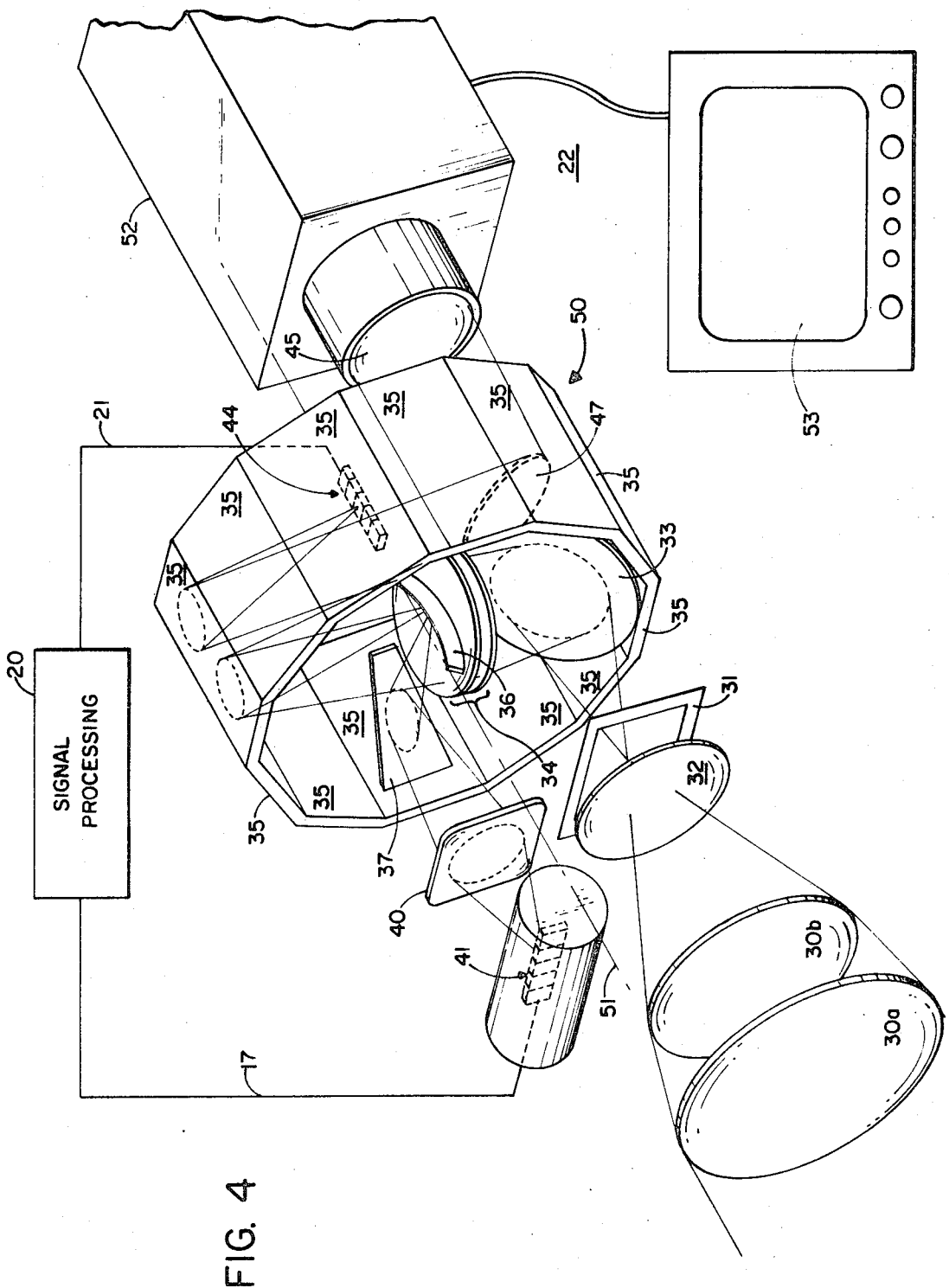
FIG. 4 is a perspective view of one embodiment of a system including my scanner.

In FIG. 1 there is illustrated an infrared imaging system 10 according to my invention. Infrared radiation 11 from the scene in the field of view of the instrument is supplied to the input optics 12 of an optical assembly 13 which further includes a scanner 14 and output optics 15. The latter includes a linear array of detectors which for efficient operation may be cooled by a supply of refrigerant at 16.

Scanner 14 functions, in combination with optics 12 and 15, to sweep an image of the field of view across the detectors, and the latter then supply a set of varying outputs on a cable 17 to signal processing apparatus 20 which may include a plurality of suitable amplifiers, filters, and other appropriate circuitry. After processing, the signals are supplied on a cable 21 to a display 22: coordination between the operation of the scanner and that of the display is necessary, and synchronizing means 23 is schematically shown for accomplishing this function.

Reference should now be made to FIG. 2, in which the path of radiation through apparatus 13 is shown: the direction changes produced by various mirrors have been omitted for clarity. At the discretion of the designer the various lenses may be made of single or multiple elements, and in this respect the figure is schematic only.

Essentially collimated infrared energy from the scene is received at an objective lens 30 which produces a real image at the plane of a field stop 31. A field lens 32 may be associated with objective lens 30 if desired. After reflection at a first folding mirror 33 the radiation passes through a first relay lens 34 which produces a second real image after reflection from a rotating prism mirror 35 presently to be described. The second image is produced at the surface of a narrow "strip mirror" 36: after reflection therefrom and from a second folding mirror 37 the radiation passes through a second relay lens 40 which produces a third image in the plane of a line array of detectors 41 responsive to infrared radiation. All the lenses named above must of course be of germanium or other material transparent to radiation in the infrared band, and the mirror surfaces must also be reflective to this radiation. The detectors 41 give outputs on a like plurality of conductors 42 making up output cable 17 of FIG. 1.

FIG. 3 suggests one suitable form which can be taken by display 22. Output cable 21 of signal processor 20 (FIG. 1) comprises a plurality of conductors 43 equal in number to those in cable 17, which are connected to a like plurality of light emitting diodes 44 arranged in the same way as are detectors 41. A lens 45 images the diodes on an observing screen 46. In passing from the diodes to the lens the emitted radiation, now in the visible band, is reflected from a folding mirror 47 and a scanner moving synchronously with scanner 14, as suggested by connection 23. Thus, visual or television supervision of the scanner may be provided.

For a more detailed mechanical showing of one embodiment of my scanner 13, reference should now be made to FIG. 4. The scanner is shown to have a single moving part in the form of a hollow inwardly reflecting prism 50 the cross section of which is a regular polygon. For convenience of illustration I have shown a prism having 12 reflecting faces 35, but 16 faces might in some cases be more desirable: in general the number of faces is a matter of selection by the designer and may in particular cases be even or odd.

The prism or drum is mounted in any suitable fashion for rotation about an axis 51 normal to the polygons at their centers, and in the embodiment shown in FIG. 4 the faces all comprise planes parallel to this axis. A slight departure from this parallel relation may be used to produce interlaced scan lines if this is desired. Any constant speed motor of suitable power rating may be used for driving the drum, to which it may be geared, belted, or otherwise mechanically connected.

Contained within the outline of drum 50 are folding mirrors 33 and 37, relay lens 34, and strip mirror 36. These elements are fixed in any suitable means so that drum 50 rotates around them. Radiation from the scene being observed reaches the instrument in a direction aligned with axis 51, and passes through objective lens 30 and field lens 32 to be imaged at field stop 31. This image is received by lens 34 after reflection at mirror 33, to be directed diametrically of the drum, and lens 34 produces a second image at strip mirror 36, after reflection of the radiation from a mirror surface 35 of the drum back along its original path. Strip mirror 36 is located on axis 51 and is very narrow, to avoid as much as possible obscuration of the light passing from lens 34 to the drum. It is preferably in the form of a cylindrical surface whose axis lies in a plane perpendicular to the axis of rotation. The reflecting surface of mirror 36 is preferably tangent to axis 51. For simplicity of illustration mirror 36 is shown in FIG. 2 as a plane, but by giving this mirror a slight curvature correction may be accomplished for the field curvature introduced by other optical elements. Strip mirror 36 is oriented so that the light reflected therefrom moves outwardly along a different radius of the drum, to be reflected by folding mirror 37 and so to pass out of the confines of the scanning drum to relay lens 40, which reimages it on the linear array of detectors 41.

The operation of this structure is to sweep the image of the scene across the array of detectors, in what might be termed a combing motion, as many times per revolution of the drum as the latter has internally reflecting faces. During each sweep or scan each detector gives an output which continuously varies with the irradiation of the detector by the scene. These outputs are suitably processed by amplification and filtering if necessary, and are supplied to a linear array of light emitting diodes 44 located along axis 51. Light from the diodes is reflected by drum mirror 35 and further folding mirror 47, and is focused by lens 45 of a television camera 52 on the target of the camera tube for display as at 53. A relay lens similar to lens 34 may be used here if desired.

Numerous objects and advantages of my invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

I claim as my invention:

1. Means for scanning the field of view along a line of sight comprising, in combination:
   a hollow scanning drum rotatable about a first axis including a plurality of inwardly reflecting surfaces substantially parallel to said axis;
   means causing rotation of said drum;
   first optical means including a first stationary folding mirror, fixed with respect to said drum and positioned to direct optically reflectable radiation having the direction of said line of sight to impinge convergingly on said reflecting surfaces successively as said drum rotates;
   a linear array of radiation detectors fixed with respect to said drum;
   and second optical means, including a second stationary folding mirror, fixed with respect to said drum and arranged to receive radiation reflected from said surfaces and direct it toward said array, whereby during rotation of said drum successive images of said field of view sweep traversely across said array, to produce varying outputs from said light detectors.

2. Apparatus according to claim 1 in which said surfaces are plane.

3. Apparatus according to claim 1 in which said surfaces are symmetrical about said axis.

4. Apparatus according to claim 1 in which said surfaces jointly define a regular polyhedral prism.

5. Apparatus according to claim 1 in which said first optical means also includes lens means for causing said radiation to impinge convergingly on said surfaces.

6. Apparatus according to claim 1 in which said first and second optical means are contained within the outline of said drum.

7. Apparatus according to claim 1 in which said detectors are outside the outline of said drum.

8. Apparatus according to claim 1 in which said second optical means also includes a further reflector lying in the path of radiation between said first folding mirror and said drum, said further reflector being of limited transverse dimension to cause minimum obscuration of said light.

9. Apparatus according to claim 6 in which said further reflector is a portion of the surface of a cylinder of which the axis lies in a plane perpendicular to said first axis, and which is tangent to said first axis.

10. Apparatus according to claim 1 including further means for causing said reflected radiation to image on said array.

11. Apparatus according to claim 5 in which said lens means includes a relay lens located within the outline of said drum between said first folding mirror and said surfaces.

12. Apparatus according to claim 8 in which said further means includes a strip mirror located within the outline of said drum and a relay lens.

13. Apparatus according to claim 1 in which said surfaces slightly depart in opposite directions alternately from a parallel relation to said axis.

14. Apparatus according to claim 1 together with a linear array of light emitting diodes contained within the outline of said drum, and means directing light from said diodes out of said drum, after reflection from said reflecting surfaces, for imaging to comprise a reproduction of said field of view.

15. Apparatus according to claim 14 in which said detectors and said optical means are operative with infrared radiation, and said diodes emit visible radiation.

16. Means for scanning the field of view along a line of sight comprising, in combination:
a hollow scanning drum rotatable about a first axis, including a plurality of inwardly reflecting plane surfaces substantially parallel to said axis;
means causing rotation of said drum;
first stationary optical means, including a first folding mirror, fixed with respect to said drum and positioned to direct infrared radiation having the direction of said line of sight to impinge convergingly on said reflecting surfaces successively as said drum rotates;
a linear array of radiation detectors fixed with respect to said drum;
and second stationary optical means, including a second folding mirror, fixed with respect to said drum and arranged to receive radiation reflected from said surfaces and direct it toward said array, whereby during rotation of said drum successive images of said field of view sweep traversely across said array, to produce varying outputs from said light detectors.

* * * * *

UNITED STATES PATENT OFFICE
CERTIFICATE OF CORRECTION

Patent No. 3,728,545        Dated  April 17, 1973

Inventor(s) Irving R. Abel

It is certified that error appears in the above-identified patent and that said Letters Patent are hereby corrected as shown below:

Claim 1, line 7, after "first" (first occurence)

insert --stationary--;

same line, after "first" (2nd occurence) cancel

--stationary--;

line 15, after "second" (first occurence)

insert --stationary--;

same line, after "second" (2nd occurence) cancel

--sta- --;

line 16, cancel "tionary".

Signed and sealed this 27th day of November 1973.

(SEAL)
Attest:

EDWARD M. FLETCHER, JR.  RENE D. TEGTMEYER
Attesting Officer         Acting Commissioner of Patents